(12) United States Patent
Lang et al.

(10) Patent No.: US 10,578,194 B2
(45) Date of Patent: Mar. 3, 2020

(54) POWERTRAIN SYSTEM AND METHOD FOR OPERATING A POWERTRAIN

(71) Applicant: DEERE & COMPANY, Moline, IL (US)

(72) Inventors: Matthias Lang, Mannheim (DE); Rainer Gugel, Plankstadt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/460,431

(22) Filed: Jul. 2, 2019

(65) Prior Publication Data

US 2019/0323578 A1    Oct. 24, 2019

Related U.S. Application Data

(62) Division of application No. 15/498,958, filed on Apr. 27, 2017, now Pat. No. 10,385,946.

(30) Foreign Application Priority Data

Jun. 10, 2016   (DE) .................. 10 2016 210 333

(51) Int. Cl.
*H02K 7/11*    (2006.01)
*F16H 3/72*    (2006.01)
*H02K 49/10*   (2006.01)
*H02K 7/116*   (2006.01)
*H02P 17/00*   (2006.01)
*H02K 7/00*    (2006.01)

(52) U.S. Cl.
CPC .............. *F16H 3/724* (2013.01); *H02K 7/11* (2013.01); *H02K 7/116* (2013.01); *H02K 49/102* (2013.01); *H02P 17/00* (2013.01); *H02K 7/006* (2013.01)

(58) Field of Classification Search
CPC .......... F16H 3/724; H02K 7/11; H02K 7/116; H02K 7/006; H02K 16/005; H02K 49/102; H02K 17/00
USPC ........................................ 475/149
See application file for complete search history.

(56) References Cited

U.S. PATENT DOCUMENTS

| | | | |
|---|---|---|---|
| 5,744,895 A | | 4/1998 | Seguchi et al. |
| 9,853,532 B2 * | | 12/2017 | Ionel .............. B60W 10/105 |
| 2011/0042965 A1 * | | 2/2011 | Atallah ............. H02K 7/11 |
| | | | 290/1 C |

FOREIGN PATENT DOCUMENTS

| | | | | |
|---|---|---|---|---|
| DE | 10318696 A1 * | 11/2004 | ......... | F16H 37/0833 |
| GB | 2523088 A * | 8/2015 | ......... | H02K 49/102 |

* cited by examiner

*Primary Examiner* — Leslie A Nicholson, III
(74) *Attorney, Agent, or Firm* — Taft Stettinius & Hollister LLP; Stephen F. Rost

(57) ABSTRACT

A powertrain system includes an input element, an output element, and a magnetic transmission stage disposed directly at the output element. The magnetic transmission stage includes a first rotor with a first number of pole pairs, a second rotor with a second number of pole pairs, the second number of pole pairs being different from the first number of pole pairs, a third rotor with a number of pole bars arranged such that the magnetic field between the first and second pole pairs is modulated. A mechanical transmission stage is disposed between the magnetic transmission stage and the input element in the powertrain, and a control means controls a power flow between the input element and the output element. The control means is connected to a rotor of the magnetic transmission stage and to a shaft of the mechanical transmission stage.

6 Claims, 3 Drawing Sheets

POWERTRAIN SYSTEM AND METHOD FOR OPERATING A POWERTRAIN

RELATED APPLICATIONS

This application is a divisional application of U.S. patent application Ser. No. 15/498,958, filed Apr. 27, 2017, which claimed the benefit of German Application Ser. No. 102016210333.4, filed Jun. 10, 2016, the disclosures of which are hereby incorporated by reference in their entirety.

FIELD OF THE DISCLOSURE

The present disclosure relates to a powertrain system and a method for operating the same, particularly with a variable output fraction.

BACKGROUND

Combine harvesters serve for harvesting grains. The material to be threshed is picked up or cut off from a field by means of a harvesting attachment and supplied by a feeder house to a threshing device which threshes the material and separates the grain. The grain is then cleaned and stored in a grain tank before it is loaded onto a transport vehicle.

In the field of continuously variable transmissions it is common for the power coming from the drive to be apportioned into multiple power paths in the transmission. In such a case at least one power path is designed with a variable fraction in which the transmission ratio between the input and the output can be adjusted variably.

In a power-split continuously variable transmission, the power is divided in the transmission, so that one fraction is directed via a path with a variable transmission ratio. The other fraction is usually directed mechanically parallel to the variable path. Subsequently the power paths are again summed via a connected gear unit. The power splitting is necessary due to the technical design. Two concepts for this are conventional in this field of technology.

The variable path is usually designed in the form of a bevel gear transmission (continuously variable transmission or "CVT"). Two shafts with respective opposing bevel gear pairs are provided. A push belt as a transmission means runs between the two pairs of bevel gears. It is used to transmit power from one pair of bevel gears to the other. The bevel gear pairs are each displaceable relative to one another in the axial direction, so that the contact length of the transmission means with the bevel gear pairs is adjusted according to the spacing of the bevel gear pairs, and the radius is simultaneously varied. By targeted control of the distances, the transmission ratio between the two shafts can be selected in a wide range.

Due to the design, the transmission means transmits the power to the bevel gears by means of frictional contact. The frictional contact and the associated power transmission are subject to fluctuations that are caused by raising and lowering the power. This results in fluctuations of the frictional force between the transmission means and the bevel gear pairs. Consequently, a relative movement arising from the drop of power transmission results.

The relative movement is to be avoided. This is accomplished by an appropriate control of the pressing force of the bevel gear pairs and in design terms by power-splitting so that only a part of the drive power is directed via the CVT. The remaining fraction is summed up again mechanically in the powertrain downstream of the CVT and directed to the output.

If this is used in high-powered drives, only a certain fraction of the power is directed via the CVT. The mechanical fraction requires a solid construction in order to direct the power past the variable path by means of classical gear units, normally spur gears or helical gears.

Another variant is the design of the variable transmission path in the form of a hydraulic transmission. In this case, the variable power fraction is converted by means of a hydraulic pump into hydraulic energy. By controlling the hydraulic pump and the hydraulic motor, the efficiency of the conversion of mechanical energy to hydraulic energy can be controlled in a wide range.

Due to the design, pressure losses occur within the hydraulic circuit, which lead to losses of power. Similarly to the CVT transmission, the hydraulics also have a hydraulic slippage, which is caused by a temperature increase of the hydraulic fluid. Therefore the controller for hydromechanical transmission systems is regulated and designed such that overheating of the hydraulic fluid is avoided.

This leads to a complex structure of transmissions for a variable transmission ratio, which have numerous components. The mechanical power path of such transmissions are adapted to the power limits of the variable transmission path. A considerable size may result, depending on the power level. Material costs rise because of the size and the associated weight of the transmission units. If used in a vehicle, this leads to an increase of weight and increased consumption.

SUMMARY

In one embodiment of the present disclosure, a powertrain system includes an input element, an output element and a magnetic transmission stage directly at the output element and having a first rotor with a first number of pole pairs, a second rotor with a second number of pole pairs, different from the first number, and a third rotor with a number of pole bars that are arranged such that the magnetic field between the first and second pole pairs is modulated. The system further includes a mechanical transmission stage between the magnetic transmission stage and the input element in the powertrain, and a control means for controlling a power flow between the input and the output elements, wherein the control means is connected to a rotor of the magnetic transmission stage and to a shaft of the mechanical transmission stage.

With the aid of the control means, particularly with electrical control means, a fast response behavior of the transmission stages can be ensured. An electrical control means, e.g., an electrical drive, offers the possibility that it can be temporarily overloaded. This is not possible with mechanical and hydraulic systems since they are immediately damaged in the event of an overload.

Owing to the magnetic transmission stage, transient load peaks above the average load level can be routed through the powertrain system. Due to the load increase, more current temporarily flows through the magnetic transmission stage and therefore higher power levels occur for a short time.

The elimination of rotating shafts in the magnetic transmission stage also makes the corresponding rolling-contact bearings unnecessary. These normally cause power losses due to the rolling processes, which are converted into heat inside the bearings, and also noise emissions due to the rolling of the rolling bodies on the raceway surfaces. Therefore the use of the magnetic transmission stage can reduce the noise emissions while simultaneously increasing the power rate.

The rotational direction for the magnetic transmission can be freely defined. This is possible because of the structure and the design calculation of magnetic transmissions of this type. Therefore an optimum can be selected for each application case, since this transmission can be selected to be a minus or a plus gear set.

High power levels can be handled with the transmission thanks to the cooperation of the mechanical and the magnetic transmissions. It is also not necessary to observe a power limit. The controller allows easy regulation of the drive system without a complicated structure. With hydraulic or mechanical systems, strict adherence to overload limits is critical. In contrast to the present powertrain system, such systems cannot respond to overload with slippage and therefore be damaged.

In another embodiment, the rotational speeds of the rotor and the shaft to which the control means is connected can be controlled independently of one another. The powertrain system can be optimally adjusted with the independent control to the driving situations that occur. In an additional configuration, the rotor and the shaft can be directly connected to one another. A small installation space can be used with the direct connection, because a direction change by means of additional gearing is not necessary. The common connection can make an emergency function possible if the control means fail.

In one embodiment, the control means can comprise a first electric motor. Fast control times can be achieved with the electric motor. The motor can output high torques and do so in a short time so that fast response behavior is possible. Based on the structure of the motor, it can also be used as a generator and thus convert incoming power into electrical power.

In another embodiment, the control means can be connected to a battery or a storage battery. This makes it possible to charge the connected battery or storage battery by operating the motor in generator mode. Conversely, power can also be output by the battery or the storage battery to the motor, so that it can itself output power to the powertrain system. In this way it is possible to respond to special drive requirements within a short time.

In one embodiment, the control means can include a second electric motor, which is connected to a shaft in the powertrain for transmitting power or rotational speed and is arranged between the input element and the magnetic transmission stage.

The second motor, which can also be operated as a generator, can be used to implement an electrical variable transmission. In this case, power is absorbed by the second motor and converted into electrical energy. This energy is modulated and converted back into mechanical power by the first motor. The power can be raised or lowered, possibly by adding or removing electrical power by means of storage batteries or batteries, for example, so that a precise adaptation to the necessary power requirements as calculated by the control means can occur. Hereby, a variable transmission ratio is possible.

In a further embodiment, electrical energy can be transferred from the second electric motor to the first electric motor. The power can thereby be output from the second motor to the first motor. It is thus always possible to adjust the output power to the required power.

In another embodiment, the mechanical transmission stage can be replaced by an additional magnetic transmission stage. The mechanical transmission gearing can therefore be avoided. Due to the structure of a geared transmission, there are always transmission losses from the rolling of the teeth flanks. These losses can be avoided with an additional magnetic transmission. In addition, the elimination of the gearing improves acoustics. The meshing of the gears always causes acoustic impulses, which the magnetic transmission does not have. The powertrain system therefore becomes quieter. Geared transmissions also require lubrication. This is not necessary for the magnetic stage and therefore the provision of lubrication can be omitted. The use of the magnetic stage lowers the complexity of the powertrain structure as a whole.

In one embodiment, the drive train system can have a second transmission element. There is a power split within the powertrain system. Therefore, two different power streams, each of which can be used for a drive, are present at the output. Thus it is possible to shift between the two power streams. This shifting can be accomplished without interrupting traction force.

The problem in the art is also solved by a method for operating a powertrain, wherein the powertrain includes an input element for introducing torque and rotational speed, two output elements for delivering torque and rotational speed, and a magnetic transmission stage comprising a first rotor with a first number of pole pairs, a second rotor with a second number of pole pairs, different from the first number, and a third rotor with a number of pole bars that are arranged such that the magnetic field between the first and second pole pairs is modulated. The powertrain further includes a mechanical transmission stage and control means for controlling torque and rotational speed between the input and output elements, wherein the torque and rotational speed are routed from the input element to a rotor of the magnetic transmission stage or to the mechanical transmission stage, wherein the magnetic transmission stage and the mechanical transmission stage are designed as summing transmissions, and a rotational speed of a rotor of the magnetic transmission stage and a rotational speed of the shaft of the mechanical transmission stage are regulated by the control means.

The power can be apportioned onto two paths with the method. Such a transmission is disclosed in GB2523088, which is hereby incorporated by reference in its entirety. The power can be apportioned as desired to the two output elements by the control means. The ratio between the two outputs is therefore freely adjustable and offers high flexibility for the respective power requirements. It is possible to switch between the two power outputs without interrupting traction force.

In another embodiment, the power can be apportioned from the input element to the magnetic and mechanical transmission stages. In this way, the respective transmission stages can be accurately matched to the power levels appearing during operation. The control means can monitor the introduced power levels very exactly. This leads to an extended service life.

In one design, a part of the power can be converted into electrical energy before power splitting and the energy can be used between the magnetic and mechanical transmission stage for controlling the same. The powertrain system can be controlled in this way without using a battery or a storage battery. The input power can thus be apportioned in any desired ratio by the control means. The connected battery/storage battery can also be charged by the electrical energy.

In a further embodiment, an electric motor can be used for control. The electric motor can be controlled by means of a simple regulation. This avoids an elaborate controller, which in turn leads to a reduced susceptibility to faults. With an electric motor, it is possible to work with high torques for the control means, thus enabling a corresponding transmission through the powertrain system. Supporting high torques therefore allows the transmission of high power levels. A boost function can also be implemented by using the electric motor. The supply of additional power from batteries or storage batteries allows an increase of the power that can be routed through the powertrain system to the output. In this way, it is possible to respond to instantaneous requirements and load peaks in the powertrain.

It is also possible to implement the electric motor directly on the rotor by directly providing coils at the air gap. Thereby the magnetic transmission can operate directly as an electric motor and an additional electric motor as a system component can be eliminated.

In one embodiment, power can be introduced by the control means at the innermost rotor of the magnetic transmission system and at the sun gear of the mechanical transmission system.

This allows an easy implementation of the controller. The installation space can thus be used ideally; the control means can be provided on the spatial axis between the magnetic and the mechanical transmission sections. By using the internal transmission components, the power ratios can be controlled by the control means directly and without further conversion.

In another embodiment, the output power streams can be present at the output elements in parallel.

It is accordingly possible to switch between the two output power streams without interrupting traction force. This can be accomplished with the aid of a clutch. It is advantageously also usable for additional connected components in the powertrain and enables a precise supply of power.

The symbolic representation introduced by Wolf, in which an epicyclic gear unit is identified by a circle for the casing and three lines for the three shafts, has proven practical for conceptual presentation of such transmissions. This representation is common and known in the technical field.

The individual power flows, depending on the switching state, can be visualized, similarly to diagrams in hydraulics or for electrical circuits.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

The embodiments herein and the various features and advantageous details thereof are explained with reference to the non-limiting embodiments in the following description. Descriptions of well-known components and processing techniques are omitted so as to not unnecessarily obscure the embodiments herein.

DETAILED DESCRIPTION

Figure 1:
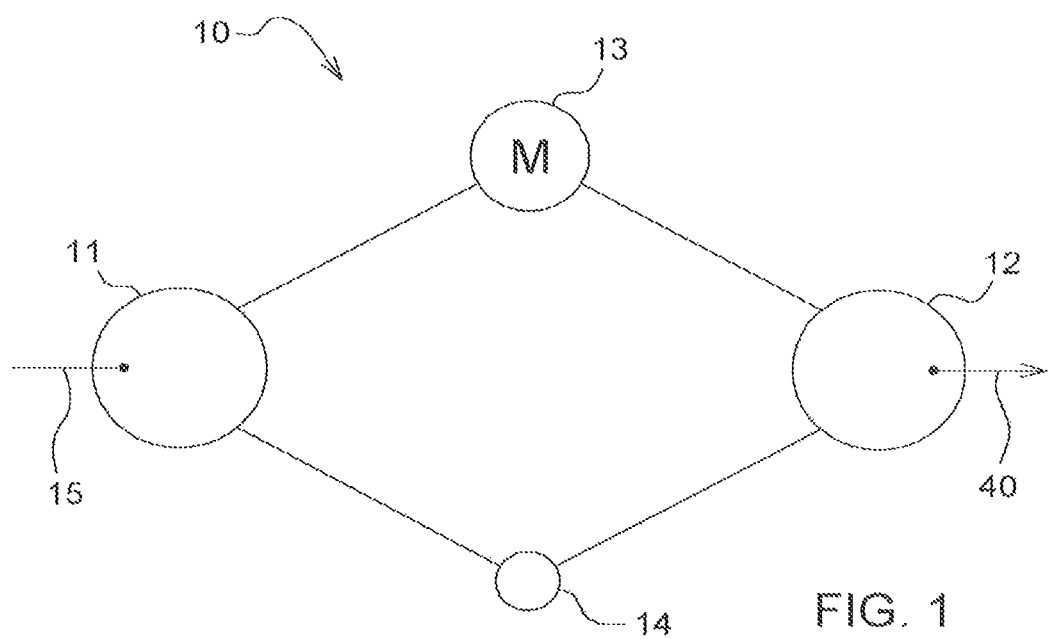
FIG. 1 is a schematic structure of a first embodiment of a powertrain system.

In the present disclosure and the illustrated embodiment of FIG. 1, a powertrain system consists of a magnetic transmission stage 11 and a mechanical transmission stage 12. A motor 13 is provided between the two transmission stages 11, 12. The motor is connected to an internal rotor of the magnetic transmission stage 11 and to the sun gear of the mechanical transmission stage 12. The motor 13 can be used in this way to control the magnetic transmission stage 11 and the mechanical transmission stage 12. In addition, the two transmission stages 11, 12 are connected to one another by means of a ring gear 14. The input power 15 is introduced into the magnetic transmission stage 11. The output power 40 for the output is provided by the mechanical transmission stage 12. Both the magnetic transmission stage 11 and the mechanical transmission stage 12 can be controlled by the motor 13 and adapted to the power conditions.

In FIG. 1, the input power and the output power are introduced and drawn off via the planet carrier of the magnetic transmission stage 11 and of the mechanical transmission 12 respectively.

Figure 2:
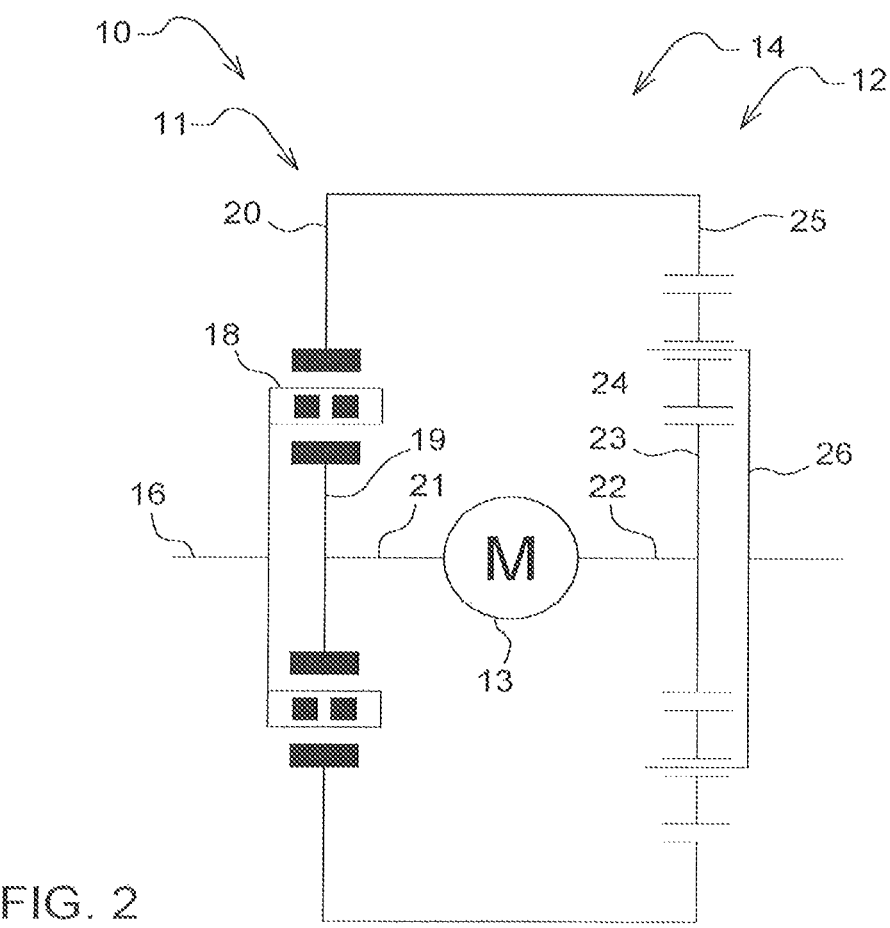
FIG. 2 is a schematic view of a further structural design of the system of FIG. 1.
Figure 5:
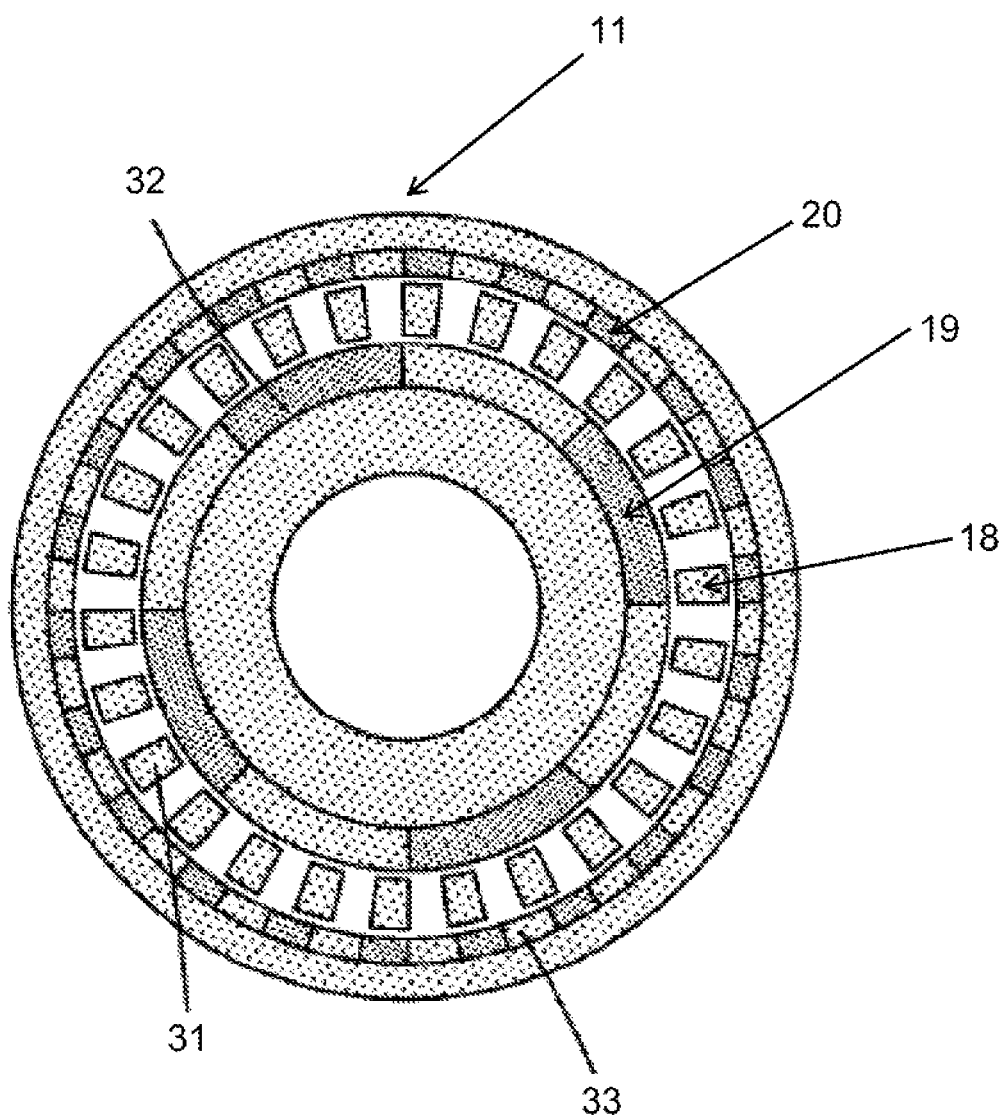
FIG. 5 is a schematic view of a magnetic transmission stage.

Referring to FIGS. 2 and 5, the input power 15 is introduced via the input shaft 16 into the magnetic transmission stage 11. Due to the design, the power is introduced into the planet carrier or the center rotor 18 of the magnetic gear transmission stage 11. The center rotor 18 includes a number of pole bars 31. The internal rotor 19 of the magnetic transmission stage 11 is driven by the motor 13 and includes a first number of pole pairs 32. The control power of the motor 13 is transmitted via a shaft 21 to the internal rotor 19. Thereby the relative power that is transmitted via the center rotor 18 to the external rotor 20 of the magnetic transmission stage 11 can be adjusted. The external rotor 20 is simultaneously the ring gear of the mechanical transmission stage 12 and includes a second number of pole pairs 33 being different than the first number of pole pairs 32. The external rotor is set into rotation by the relative power that is introduced into the external rotor of the magnetic transmission stage 11 and this rotation is transmitted to the ring gear 25 of the mechanical transmission stage 12.

The mechanical transmission stage 12 is likewise controlled by the motor 13. The control power is therefore transmitted to the sun gear 23 of the mechanical transmission stage 12 via a shaft 22. Thereby power is applied to the planet gear 24 of the mechanical transmission stage 12 so that the planet gear rotates relative to the ring gear 25. This rotation is transferred to the planet carrier 26 of the magnetic transmission stage 12, so that an output power 40 is provided.

Figure 3:
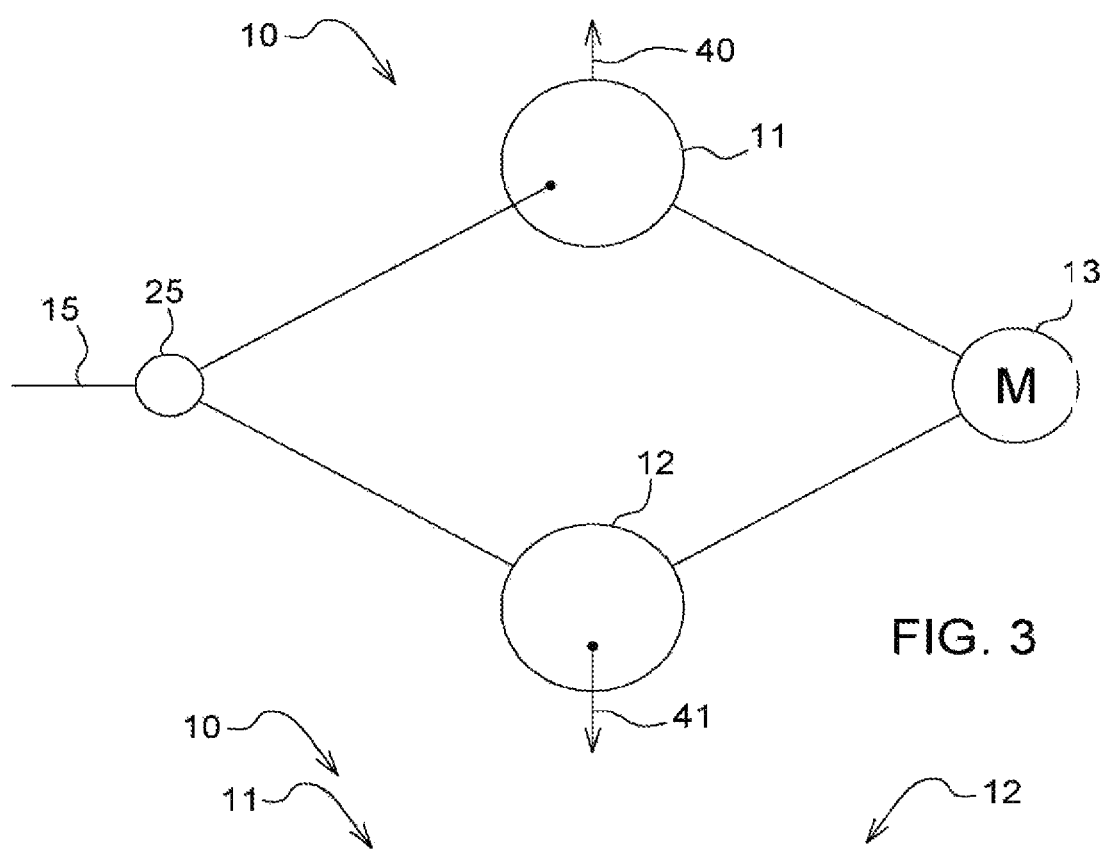
FIG. 3 is a schematic view of a structure of an additional embodiment of a powertrain system.

Referring to FIG. 3, a schematic structure of an additional embodiment of the present disclosure is illustrated with Wolf symbols. The powertrain system 10 here consists of a magnetic transmission stage 11 and a mechanical transmission stage 12. Both transmission stages are connected to one another via the planet carrier of the magnetic transmission stage, which simultaneously constitutes the ring gear for the mechanical transmission stage 12. In this way, the introduction of power is apportioned simultaneously to the magnetic and the mechanical transmission stages. Both the magnetic transmission stage 11 and the mechanical transmission stage 12 are controllably connected to a motor 13. Thereby a respective output power is provided by both the magnetic transmission stage 11 and the mechanical transmission stage 12.

Figure 4:
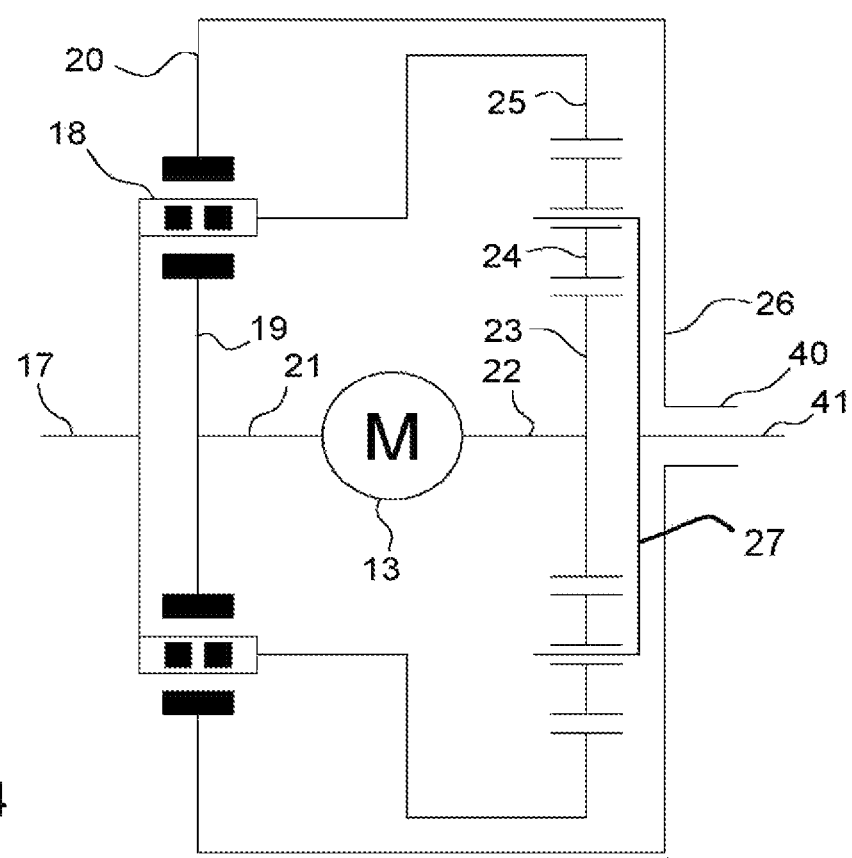
FIG. 4 is a schematic view of an additional structural view of the system of FIG. 3.

In FIG. 4, an additional structural design of the embodiment shown in FIG. 3 is further illustrated. Here, the input power 15 is apportioned via the input shaft 17 to the center rotor 18 of the magnetic transmission stage 11 and simultaneously via the ring gear 25 of the mechanical transmission stage 12 and is introduced into the powertrain system 10. The power is apportioned to the magnetic and mechanical power paths of the powertrain system 10. In the same form as in the embodiment of FIGS. 1 and 2, a control power is introduced by means of a motor 13 via the shaft 21 into the internal rotor 19 of the magnetic transmission stage 11. Thereby an output power 40 is applied to the external rotor 20 of the magnetic transmission stage 11 and output to a hollow shaft 27.

At the same time power is introduced via the ring gear 25 into the mechanical transmission stage 12. By means of the planet gear 24 and due to the simultaneous power control by the motor 13 via the control shaft 22 onto the sun gear 23, power is applied to the planet carrier 26 of the mechanical transmission stage 12 and is output via the output shaft 27.

Due to the two different output power streams 40 and 41, which are simultaneously present at shafts 27 and 26, it is possible to switch between the two power streams with a clutch.

The powertrain system can be used in all drives in which a change of power between the drive and the output is provided. In particular, the powertrain system can be provided in vehicles. A reduction of the overall size and saving of space can be achieved with the system due to the elimination of the usual reverse gear and the corresponding additional shaft.

In addition, the powertrain system can be connected to an oil lubrication system in order to guarantee lubrication and allow dissipation of heat. The system can also be combined with a hydraulic transmission in order to realize additional power splitting.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for operating a powertrain, comprising:
providing an input element for introducing torque and rotational speed, two output elements, a magnetic transmission stage having a first rotor with a first number of pole pairs, a second rotor with a second number of pole pairs different from the first number of pole pairs, and a third rotor with pole bars arranged such that a magnetic field between the first and second pole pairs is modulated, and a mechanical transmission stage;
providing the magnetic transmission stage and the mechanical transmission stage as summing transmissions;
delivering torque and a rotational speed by the output elements;
controlling the torque and rotational speed between the input element and the output elements via a control means;
conducting the torque and rotational speed from the input element to a rotor of the magnetic transmission stage or to the mechanical transmission stage; and
regulating a rotational speed of one of the rotors of the magnetic transmission stage and a rotational speed of a shaft of the mechanical transmission stage by the control means.

2. The method of claim 1, further comprising apportioning power from the input element to the magnetic and the mechanical transmission stages.

3. The method of claim 1, further comprising:
converting a portion of power into electrical energy before power splitting; and
using the electrical energy between the magnetic and mechanical transmission stage for controlling both stages.

4. The method of claim 1, further comprising using an electric motor as the control means.

5. The method of claim 1, further comprising introducing a power by the control means at an innermost rotor of the magnetic transmission stage and at the sun gear of the mechanical transmission stage, where the innermost rotor comprises either the first rotor, the second rotor, or the third rotor.

6. The method of claim 1, wherein the output power streams are present in parallel at the output elements.

* * * * *